UNITED STATES PATENT OFFICE.

HENRY LOEWENBERG, OF NEW YORK, N. Y.

IMPROVEMENT IN PROCESSES OF MAKING IMITATION BRAIDS, TRIMMINGS, &c.

Specification forming part of Letters Patent No. 130,510, dated August 13, 1872.

*To all whom it may concern:*

Be it known that I, HENRY LOEWENBERG, of the city, county, and State of New York, have invented a new and Improved Process for Producing Imitation Braids, Trimmings, Leather, &c.; and I hereby declare the following to be a full, clear, and exact description thereof, which will enable those skilled in the art to make and use the same.

This invention relates to an improvement on a patent granted to me for an improvement in imitation braids, trimmings, leather, &c., dated August 2, 1870; reissue No. 4,444, dated June 27, 1871, in which I have described the production of flexible and elastic casts produced by first making a mold by casting over the article from which a fac-simile is to be produced a compound of glue or gelatinous material with oil or glycerine, or in any other desirable manner, and then pouring into said mold a solution of glue mixed with oil or glycerine, and before the solution has set, or almost immediately after the mold has been filled, the solution is poured out, leaving a layer in the mold, which forms an exact fac-simile of the pattern from which the mold has been prepared.

In carrying out this invention I have found that in many cases it is difficult or almost impossible to obtain shells of a uniform thickness, and I have therefore adopted the following process: After the mold has been prepared I spread the compound, from which the articles are to be prepared, over the inner surface of the mold by means of a brush or otherwise applying the compound gradually in such a manner that when the compound has been spread over all parts of the mold to the desired thickness a layer of uniform thickness throughout is obtained, which is of great importance for many articles.

The shells obtained by the above-named process are similar in every respect to metallic shells produced by the galvano-plastic process, and they can be strengthened by a backing of any suitable material. Any compound may be used which can be spread in the manner above described, and which is suitable for the purpose.

What I claim as new, and desire to secure by Letters Patent, is—

The within-described process for producing fac-similes of leather, straw, enameled cloth, trimmings, embroideries, or any similar article, by first preparing a suitable mold and then spreading the compound over the inner surface of said mold to a uniform thickness, substantially in the manner herein set forth.

HENRY LOEWENBERG.

Witnesses:
W. HAUFF,
E. F. KASTENHUBER.